US010717391B1

(12) United States Patent
Guadagno

(10) Patent No.: US 10,717,391 B1
(45) Date of Patent: Jul. 21, 2020

(54) SYSTEM FOR A PLACARD HOLDER

(71) Applicant: Richard Guadagno, Edinburg, PA (US)

(72) Inventor: Richard Guadagno, Edinburg, PA (US)

(*) Notice: Subject to any disclaimer, the term of this patent is extended or adjusted under 35 U.S.C. 154(b) by 0 days.

(21) Appl. No.: 16/658,593

(22) Filed: Oct. 21, 2019

(51) Int. Cl.
B60R 7/05 (2006.01)
G09F 7/18 (2006.01)
G09F 3/10 (2006.01)
B60R 7/08 (2006.01)

(52) U.S. Cl.
CPC .............. B60R 7/05 (2013.01); B60R 7/08 (2013.01); G09F 3/10 (2013.01); G09F 7/18 (2013.01)

(58) Field of Classification Search
CPC ............ Y10T 24/1952; Y10T 24/3651; B60R 16/0222; B60R 7/05
USPC ........................................ 40/593, 643, 591
See application file for complete search history.

(56) References Cited

U.S. PATENT DOCUMENTS

| 479,884 | A | * | 8/1892 | Kersting | A41D 25/027 24/64 |
| 480,352 | A | * | 8/1892 | Turner | A44B 1/32 24/109 |
| 5,477,633 | A | * | 12/1995 | Leinberger | G09F 3/005 2/16 |
| 6,276,081 | B1 | * | 8/2001 | Shedd | G09F 21/04 116/28 R |
| 7,686,373 | B1 | * | 3/2010 | McCabe | B60R 7/05 224/277 |
| 9,787,348 | B2 | * | 10/2017 | Srour | H04B 1/3888 |
| 10,410,555 | B2 | * | 9/2019 | Nigro | G09F 21/02 |
| 2011/0011906 | A1 | * | 1/2011 | Musgrave | A45F 5/02 224/269 |
| 2011/0070018 | A1 | * | 3/2011 | Nedelman | B60R 7/08 403/24 |

* cited by examiner

Primary Examiner — Kristina N Junge
(74) Attorney, Agent, or Firm — Sanchelima & Associates, P.A.; Christian Sanchelima; Jesus Sanchelima

(57) ABSTRACT

A system for a placard holder including a holding assembly and an attaching assembly is disclosed herein. There is a bracket made of metal or plastic configured to hold a placard and attach to a vehicle's visor thereby enabling the placard to swing down once the visor is moved down. There is a hole in the middle of the bracket adapted to receive a fastener therein for holding of all components together. Also utilized is hook and loop fasteners for removable attachment of the holding assembly to the visor. Further, the system for a placard holder includes a unique design and quarter-shaped profile. It is possible to retrofit the system for a placard holder onto existing visors of vehicles.

8 Claims, 4 Drawing Sheets

SYSTEM FOR A PLACARD HOLDER

BACKGROUND OF THE INVENTION

1. Field of the Invention

The present invention relates to a system for a placard holder and, more particularly, to a system for a placard holder that can be retrofitted onto the visor of vehicles and once the visor is lowered so is the placard.

2. Description of the Related Art

Several designs for placard holders have been designed in the past. None of them, however, include a metal bracket or plastic bracket configured to hold a placard and attach to a vehicle's visor thereby enabling the placard to swing down once the visor is moved down. The present invention may include a hole in the middle and utilize hook and loop fasteners or other fastening means for removable attachment to the visor.

Applicant believes that a related reference corresponds to U.S. patent No. 2011/0067278 for a visor mounted pivotal display holder for a handicapped parking permit. It comprises a clear sleeve or board with clips and a clip assembly that attaches to a vehicle sun visor. Another related reference corresponds to U.S. Patent No. 2008/0290122 for a handicap parking permit holder. None of these references, however, teach of the unique design and quarter-shaped profile of the present invention, with a hole in the middle and utilizing hook and loop fasteners or other fastening means to hold onto the placard.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a placard holder that can be retrofitted onto the existing visor of vehicles.

It is another object of this invention to provide a placard holder that is easy to assemble, mount and use.

It is still another object of the present invention to provide a placard holder that is mounted onto the existing visor of vehicles that enables the placard to swing down once the visor is moved down.

It is yet another object of this invention to provide such a placard holder that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
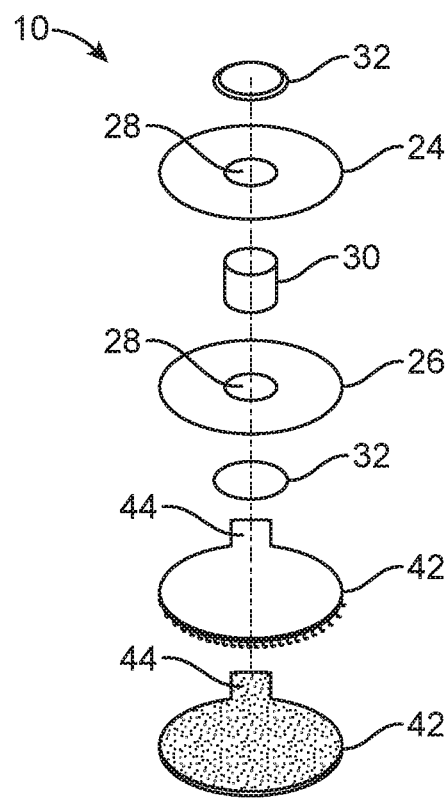
FIG. 1 represents an exploded view of the present invention.

Referring now to the drawings, where the present invention is generally referred to with numeral 10, it can be observed that it, placard holder 10, basically includes a holding assembly 20, an attaching assembly 40 and a vehicle assembly 60.

Figure 2:
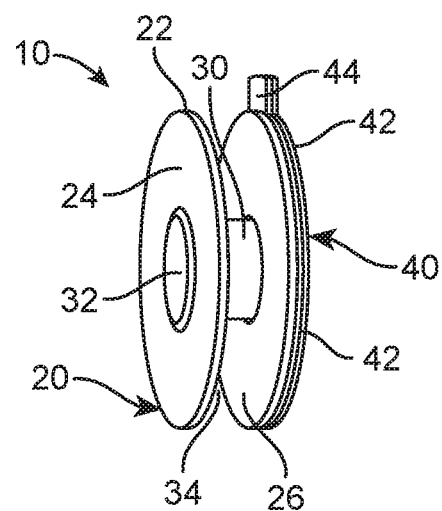
FIG. 2 shows the present invention fully assembled.
Figure 3:
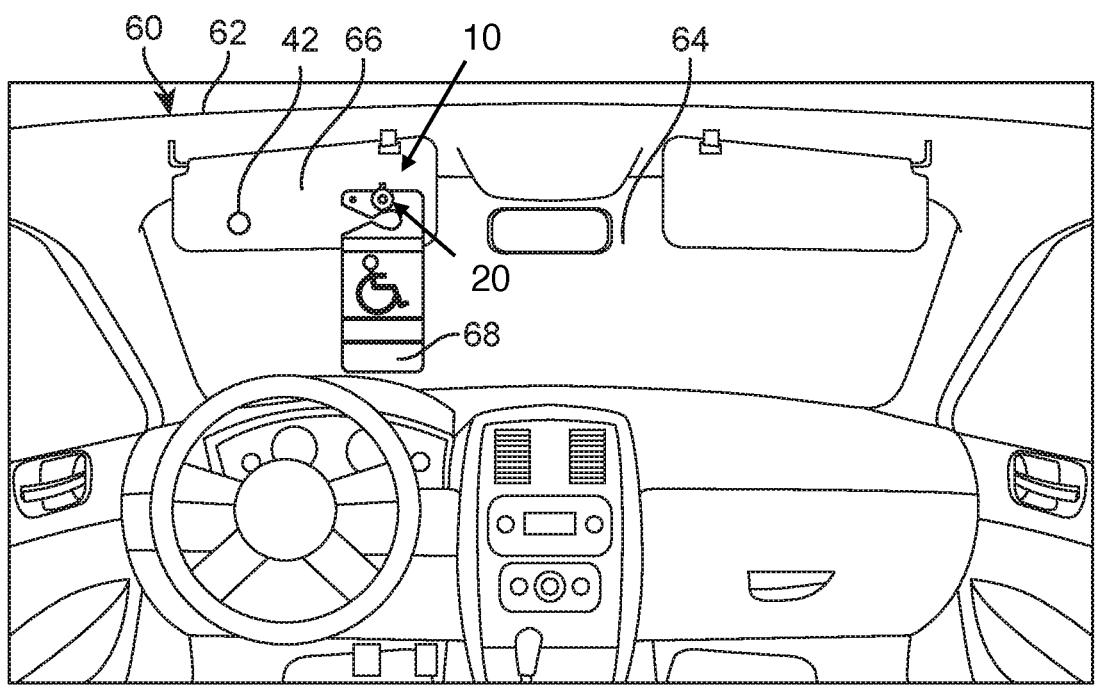
FIG. 3 illustrates the present invention in use and retrofitted onto an existing visor of a vehicle as seen from the interior of the vehicle.
Figure 4:
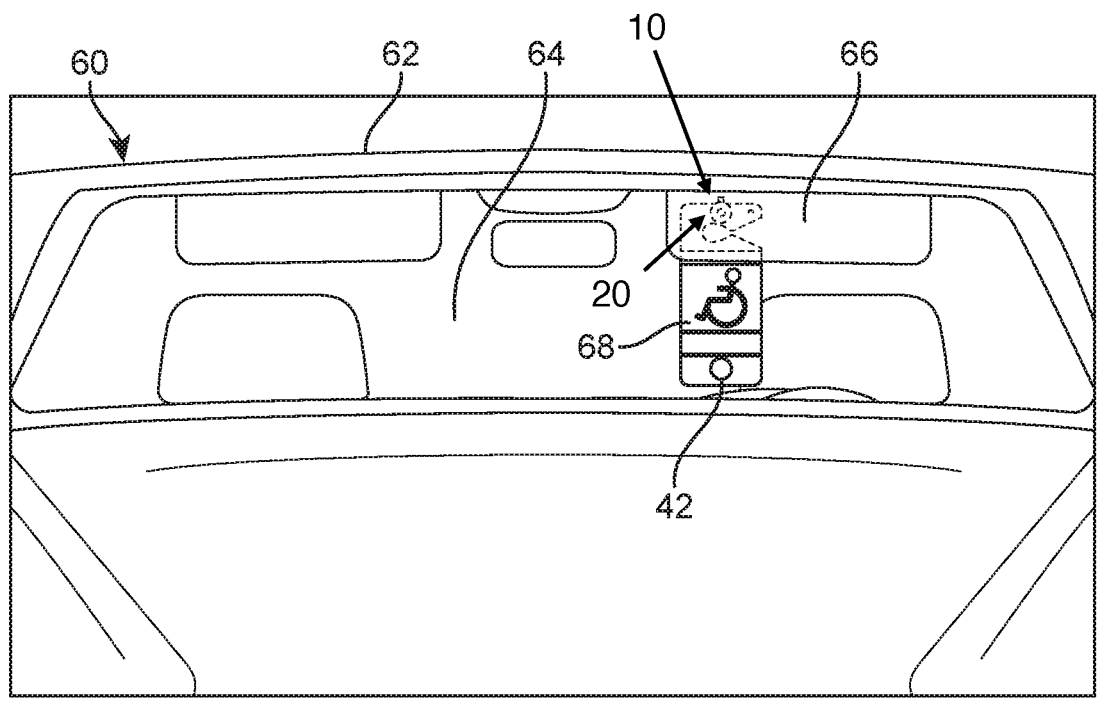
FIG. 4 illustrates the present invention in use and retrofitted onto an existing visor of a vehicle as seen from the exterior of the vehicle.
Figure 5:
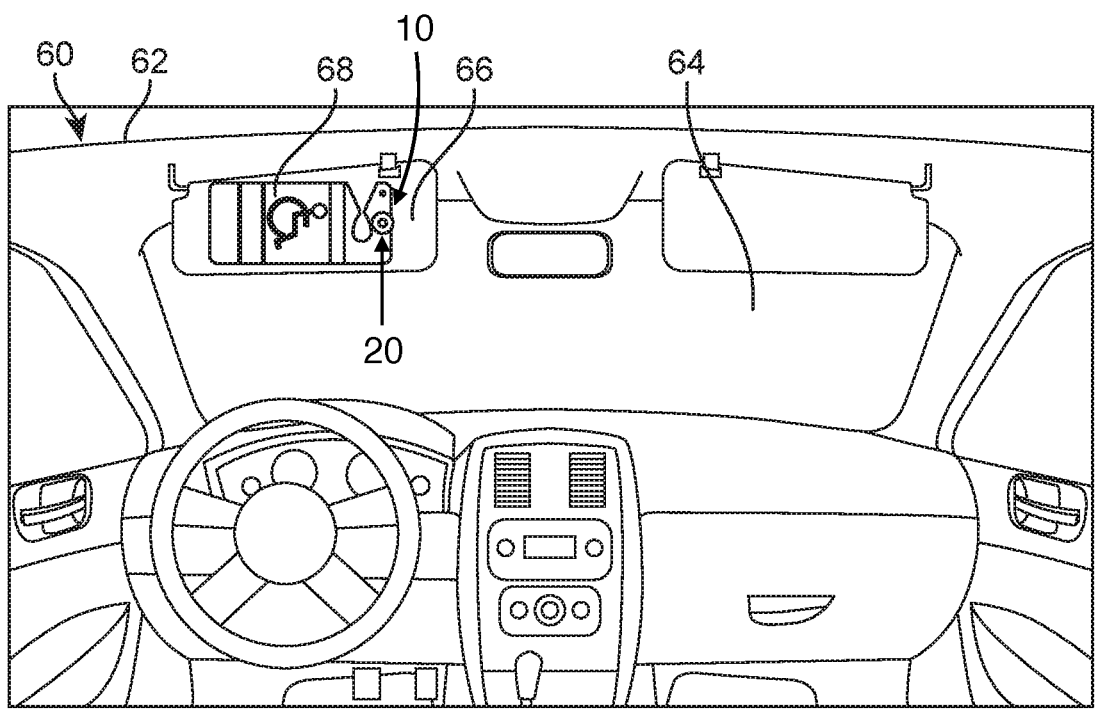
FIG. 5 illustrated the present invention mounted to the visor of a vehicle with a placard being stored aside as only the visor is in use and not the placard.

It can be seen that the present invention, placard holder 10 is shown in FIGS. 1-5. Holding assembly 20 may include a bracket 22 having a top disk 24 and a bottom disk 26. Top disk 24 and bottom disk 26 may preferably be identical in shape, size, material and dimensions. Top disk 24 and bottom disk 26 may be of a predetermined size. In one embodiment, it may be suitable for top disk 24 and bottom disk 26 to be quarter sized and circular shaped. In one embodiment, it may be suitable for top disk 24 and bottom disk 26 to be made of plastic as to allow the present invention to be light weight. In an alternate embodiment, it may be suitable for top disk 24 and bottom disk 24 to be made of metal, aluminum, rubber or any other suitable materials. Each of top disk 24 and bottom disk 26 may include a disk opening 28 therethrough. In one embodiment, disk opening 28 may preferably be located at a center of top disk 24 and bottom disk 26. It should be understood that any other predetermined location may be suitable for disk opening 28. Disk opening 28 may be of a predetermined shape and dimension. Therethrough disk opening 28 of both top disk 24 and bottom disk 26 may be a fastener 30. Fastener 30 may separate top disk 26 and bottom disk 28. Fastener 30 may be of a shape and dimension that cooperates with disk opening 28. Fastener 30 may be received by a cap end 32 on each outer side of top disk 24 and bottom disk 26. In one embodiment, cap end 32 may be mounted to each outer side of top disk 24 and bottom disk 26 with an adhesive. When end cap 32 is mounted onto each of top disk 24 and bottom disk 26, disk opening 28 of each of top disk 24 and bottom disk 26 may be entirely covered as end cap 32 may be larger in dimensions than disk opening 28. Both ends of fastener 30 are then inserted into an opening of each of end cap 32. Thereby, resulting in top disk 24 and bottom disk 26 being spaced apart and creating an inner space 34. In one embodiment, end cap 32 may be circular in shape.

Placard holder 10 may include attaching assembly 40 thereon. In one embodiment, attaching assembly is mounted to the outer side of bottom disk 26. Attaching assembly 40 includes attaching members 42 mounted onto bottom disk 26. Attaching members 42 may be in the form of two-part attaching means such as those having a male member and a female member that engage one another. As such attaching members 42 may preferably be hook and loop straps, dual locking tape, snap buttons or the like as known in the art. In an alternate embodiment, other fastening means such as fasteners, adhesives, welding and the like as known in the art may be used with the present invention. Preferably, two-part attaching means are to be used with the present invention. One part is mounted to the outer side of bottom disk 26 and a second part is mounted onto a surface. Thereby resulting in holding assembly 20 and attaching assembly 40 being received, held and secured onto a surface such as a visor 66. Attaching members 42 may preferably be in the shape and dimension that cooperates with bottom disk 26. Attaching member 42 entirely covers the outer side of bottom disk 26. Attaching member 42 may include a gripping portion 44 protruding outwardly beyond the edges of top disk 24 and bottom disk 26. Gripping portion may be adapted to allow a user to grab gripping portion 44 to remove the present invention from the surface previously attached to.

As can be seen in the immediate embodiment, the present invention includes vehicle assembly 60. Vehicle assembly 60 includes a vehicle 62 having a vehicle interior 64. Located in vehicle interior 64 may be visor 66. Holding assembly 20 having attaching assembly 40 mounted thereon may preferably be removably mounted onto visor 66 of vehicle 62. More specifically, attaching members 42 removably attach bracket 22 onto visor 66. With bracket 22 mounted onto visor 66, a placard 68 can be inserted and secured therein inner space 34 of bracket 22 by being mounted thereon fastener 30 extending through inner space 34. Placard 68 may spin freely within inner space 34. Placard 68 may include attaching members 42 at a lower portion thereof. As such, visor 66 may include an additional of attaching members 42 mounted thereon to receive the attaching members 42 located on placard 68.

It should be understood that the present invention can be retrofitted onto existing vehicles or cars. In an operational setting the present invention functions as follows. Firstly, attaching members 42 are placed on visor 66 of vehicle 62. Then attaching members 42 mounted onto bracket 22 and more specificity to the outer side of bottom disk 26 are received by the mounting members 42 located on visor 66. With bracket 22 secured to visor 66, it is then possible to insert and secure placard 68 into inner space 34 of bracket 22. Placard 68 may preferably include attaching members 42 mounted thereon. In one embodiment, attaching members may be on a lower portion of placard 68. Attaching members 42 located on placard 68 are received and secured by additional attaching members 42 on visor 66 that cooperate with the location of attaching members 42 on placard 68. The additional of attaching members 42 to receive attaching members 42 mounted on a front side of placard 68 is located horizontally away from holding assembly 20. Typically, when there is no need for placard 68, visor 66 is raised to a closed position. When there is a need for placard 68, visor 66 is lowered or moved downwardly and out swivels placard 68 into position vertically to be able to be displayed. In the event that there is a need for visor 66, but not placard 68, placard 68 is secured horizontally to visor 66 with attaching members 42 located thereon placard 68.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a placard holder, comprising:
   a. a holding assembly including a bracket, said bracket having a top disk and a bottom disk each having a disk opening therethrough at a center of said top and bottom disk, said top and bottom disk separated by a fastener extending therethrough said disk opening, wherein said fastener is openly exposed from said disk opening of said top and bottom disk, said fastener received by an end cap both ends of said fastener, said end cap mounted on an out surface of said top and bottom disk, said end cap having a diameter that greater than a diameter of said disk opening but less than a diameter of said top and bottom disk, said end cap being mounted on said out surface through an adhesive, said top and bottom disk having an inner space therebetween created by said fastener extending therebetween;
   b. an attaching assembly including a first set of attaching members mounted to an outer surface of said bottom disk, said first set of attaching members being a male member and a female member, said first set of attaching members including a gripping portion extending upwardly from said first set of attaching members, said gripping portion having a rectangular shape and protrudes outwardly from and edge of said bottom disk;
   c. a vehicle assembly including a vehicle having a vehicle interior with a visor mounted thereon, said vehicle assembly further including a placard, a second set of attaching members placed on a rear end of said placard, a third set of attaching members placed on a front end of said visor, wherein said second set of attaching members couple with said third set of attaching members to create a secure connection;
   d. said holding assembly removably mounted to said visor with said first set of attaching members, said placard is secured into said inner space by being mounted onto said fastener, said placard can swivel freely within said inner space, said placard swivels downwardly upon said visor being moved downwardly.

2. The system of claim 1, wherein said bracket is circular shaped.

3. The system of claim 1, wherein said bracket is quarter sized.

4. The system of claim 1, wherein said first set of attaching members are one of hook and loop straps, dual locking tape, snap buttons.

5. The system of claim 1, wherein said placard is stored horizontally thereon said visor when said visor is in use but said placard is not being displayed.

6. The system of claim 1, wherein said placard holder can be retrofitted onto existing vehicles.

7. The system of claim 1, wherein said gripping portion is pulled by a user in order to remove said placard holder from said visor.

8. The system of claim 1, wherein said gripping portion extends beyond the edges of said top and bottom disk.

* * * * *